US009547819B1

(12) United States Patent
Gotsmann et al.

(10) Patent No.: US 9,547,819 B1
(45) Date of Patent: Jan. 17, 2017

(54) PHASE-CHANGE MATERIAL TIME-DELAY ELEMENT FOR NEUROMORPHIC NETWORKS

(71) Applicant: International Business Machines Corporation, Armonk, NY (US)

(72) Inventors: Bernd W. Gotsmann, Horgen (CH); Siegfried F. Karg, Adliswil (CH); Volker Schmidt, Pegnitz (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/948,577

(22) Filed: Nov. 23, 2015

(51) Int. Cl.
*G06N 3/063* (2006.01)
(52) U.S. Cl.
CPC .................... *G06N 3/0635* (2013.01)
(58) Field of Classification Search
None
See application file for complete search history.

(56) References Cited

U.S. PATENT DOCUMENTS

| 3,200,354 | A | 8/1965 | White |
| 6,999,953 | B2 | 2/2006 | Ovhsinsky |
| 7,687,971 | B2 | 3/2010 | Stokes et al. |
| 9,015,094 | B2 | 4/2015 | Suri et al. |
| 2011/0119214 | A1* | 5/2011 | Breitwisch ........... G06N 3/0635 706/33 |
| 2012/0330873 | A1* | 12/2012 | Suri ....................... H01L 45/04 706/26 |
| 2013/0228751 | A1* | 9/2013 | Gotsmann ............. B82Y 10/00 257/24 |

OTHER PUBLICATIONS

Bez, R., et al. "Phase change memory cell concepts and designs." Phase Change Materials. Springer US, 2009. pp. 355-380.*
Kuzum, D., et al. "Nanoelectronic programmable synapses based on phase change materials for brain-inspired computing." Nano letters 12.5 (2011): pp. 2179-2186.*
H-Ki Lyeo, et al.,"Thermal Conductivity of Phase-Change Material Ge2Sb2Te5", Applied Physics Letters, vol. 89, Oct. 2006, p. 1-4.
I.R. Cox-Smith, et al., I.R. Cox-Smith, H.C. Liang, R.O. Dillon, "Sound velocity in amorphous films of germanium and silicon", J. Vac. Sci. Technol. A. 3(3), 674, 1985.

* cited by examiner

*Primary Examiner* — Kakali Chaki
*Assistant Examiner* — Eric Nilsson
(74) *Attorney, Agent, or Firm* — Cantor Colburn LLP; David Quinn

(57) ABSTRACT

A synapse for a neuromorphic network is provided. The synapse includes a time-delay portion having a first end and a second end, a first actuator located at the first end and in operational contact with the time-delay portion, and a second actuator located at the second end and in operational contact with the time-delay portion. The time-delay portion is formed from a phase change material wherein a change in the material of the time-delay portion alters a propagation time of a signal transmitted from the first actuator to the second actuator.

20 Claims, 4 Drawing Sheets

PHASE-CHANGE MATERIAL TIME-DELAY ELEMENT FOR NEUROMORPHIC NETWORKS

FIELD

This application relates to neuromorphic networks, and in particular, to phase-change material time-delay elements for neuromorphic networks.

BACKGROUND

Neuromorphic networks or physical neural networks are used in pattern recognition and classification, with many potential applications from fingerprint, iris, and face recognition to target acquisition, etc. The parameters (e.g., 'synaptic weights') of the neuromorphic networks are adaptively trained on a set of patterns during a learning process, following which the neuromorphic network is able to recognize or classify patterns of the same kind.

A key component of a neuromorphic network is the 'synapse,' at which weight information is stored, typically as a continuous-valued variable. For applications that would benefit from compact, high-performance, low-power, portable neuromorphic network computation, it is desirable to be able to construct high-density hardware neuromorphic networks having a large number of synapses ($10^9$-$10^{10}$ or more). Currently a neuromorphic network is typically realized as a software algorithm implemented on a general-purpose computer, although hardware for neuromorphic networks exist.

Currently, physical neural networks may be implemented with adjustable resistance material used to emulate the function of a neural synapse. The coupling strength between an input and an output "neuron" may be adjusted through the magnitude of the resistance of the synapse. A timing-dependent coupling between nodes within a network, with a synapse located therebetween, may be advantageous. The synapse would then provide a time delay to an incoming pulse before it is transmitted to the output. Implementations of time delay elements may be mercury delay lines. The time-delay that is achieved by such a mercury delay line is determined by the length of the tube divided by the speed of sound in liquid mercury. Thus, when an acoustic signal is transmitted through the mercury delay line, the signal delivery from one end to the other may be impacted. To tune such a configuration, the length of the mercury delay line may be changed.

Neuromorphic network applications may include pattern recognition, classification, and identification of fingerprints, faces, voiceprints, similar portions of text, similar strings of genetic code, etc.; data compression; prediction of the behavior of systems; feedback control; estimation of missing data; "cleaning" of noisy data; and function approximation or "curve fitting" in high-dimensional spaces. Moreover, finding local or global minima (maxima) of complex optimization problems may be targeted by neuromorphic networks.

SUMMARY

A synapse for a neuromorphic network is provided. The synapse includes a time-delay portion having a first end and a second end, a first actuator located at the first end and in operational contact with the time-delay portion, and a second actuator located at the second end and in operational contact with the time-delay portion. The time-delay portion is formed from a phase change material wherein a change in the material of the time-delay portion alters a propagation time of a signal transmitted from the first actuator to the second actuator.

DETAILED DESCRIPTION

Figure 1:
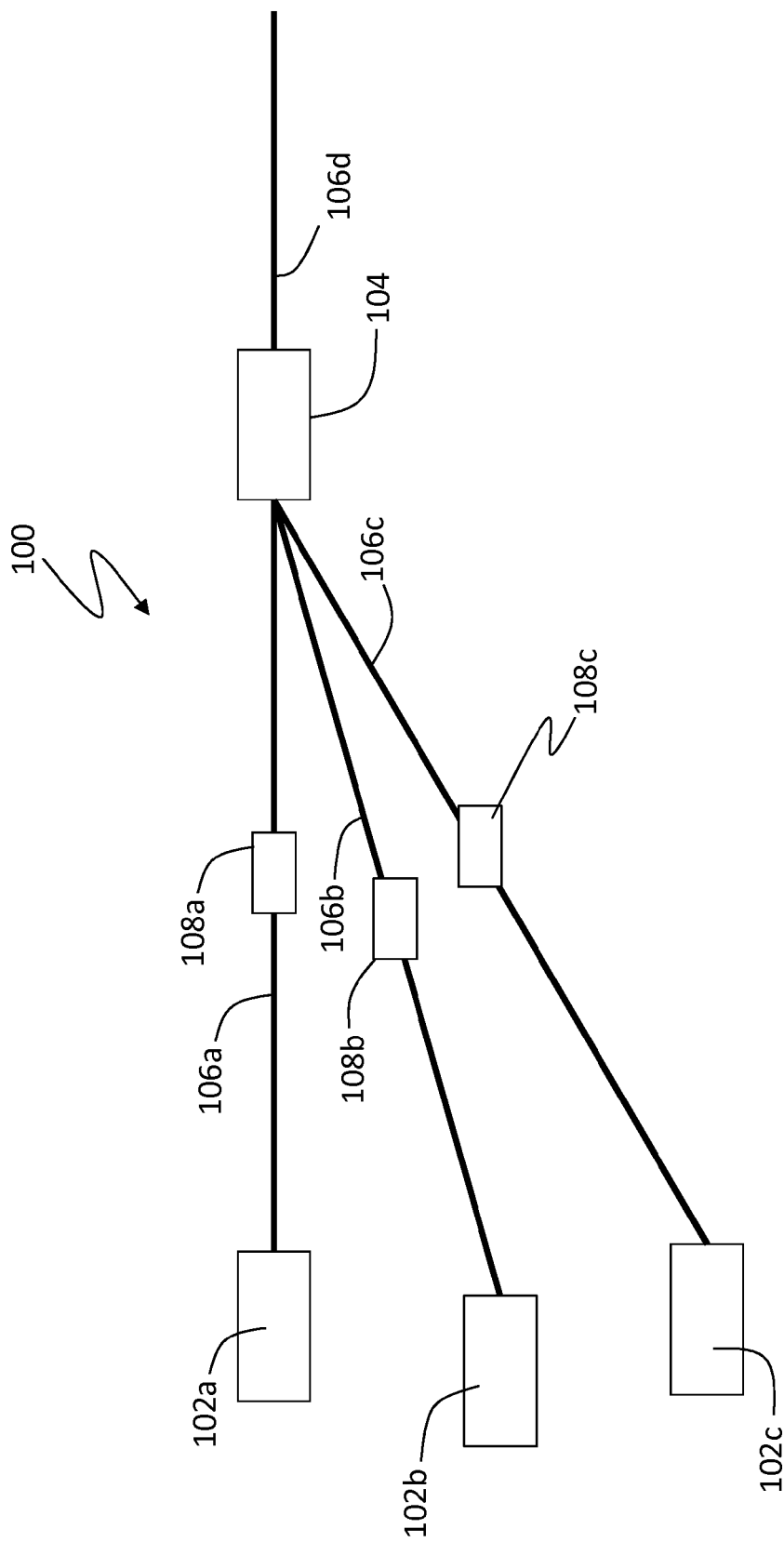
FIG. 1 is a schematic illustration of a neuromorphic network in accordance with an embodiment of the present disclosure.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments will be described with reference to the attached drawings.

According to example embodiments, a basic layout of hardware-implemented neuromorphic networks consist of a set of regularly-spaced "x" and "y" lines intersecting at synaptic nodes. A synaptic node may consist of a programmable analog or multilevel resistor, which may preferably be non-volatile. In at least one example embodiment, this functionality may be realized by a phase change material (PCM) device, which, if necessary, may be programmed with feedback. The read/write functionality may be achieved by the presence of compact controller logic units each having 4-5 or more bits, each attached to an "x" and "y" line running along edges of the array of synaptic nodes. The controllers have functionalities including analog-to-digital (A/D) inputs, digital-to-analog (D/A) outputs, storage for several numbers each having 4-5 or more bits, digital I/O lines, and nonlinear sigmoid-type outputs.

For machine learning (i.e., training of the network), one method involves using multilevel programming of each synaptic resistance unit within a network, and using the functional capability of the controllers to program the synaptic levels, while maintaining very compact synapse structures (e.g., an element plus one to three transistors, depending upon a desired configuration). For example, using 30 nm CMOS (complementary metal oxide semiconductor) fabrication technology, a synaptic density of $3.6 \times 10^9$ cm$^{-2}$ may be achieved, with $6 \times 10^4$ controllers attached to each x-line and each y-line. The controllers may consist of $10^4$ or more transistors. The energy required per synapse per step (i.e., per change of one synaptic weight) is several pico-Joules (pJ). For each presentation of an input to the neuromorphic network during learning, the desired weight updates at all the synapses may be performed in a time on the order of 0.02 seconds. During the recognition stage (i.e., following synapse training), the energy consumption and recognition time per image may be reduced.

As such, synapses are a key element in neuromorphic networks. The synapses provide plasticity and/or memory that enable the network to adjust during training, e.g., exhibit learning and cognitive behavior. Due to the high density achieved in neuromorphic networks, a strong interconnectivity exists between all synaptic nodes. However, as described above, there are limits to the neuromorphic networks due to programmable controllers and electrical control and command at the synaptic level, including but not limited to control of signal timing and/or time-delay in synapses of a neuromorphic network.

Turning now to FIG. 1, an example portion of a neuromorphic network 100 is shown. In FIG. 1, a first neuron or node 102a and a second neuron or node 104 are connected via a portion of a connector 106a that is upstream of the second node 104. The portion of the connector 106a includes a first synapse 108a, which may be configured as described herein. The characteristics of the first synapse 108a are that its transmission (i.e., signal propagation therethrough) can permanently change. For example, the synaptic state can be changed dependent on a time dependence of a pre- and a postsynaptic pulse between the first node 102a and the second node 104. The first synapse 108a may be configured to control the transmission through the first synapse 108a such that pulses or signals from the first node 102a may be affected, altered, dampened, suppressed, and/or prevented completely, such that the pulses or signals cannot reach the second node 104. Controlling the properties of the synapse is the action of weighting. If the weighting is increased or strengthened, the transmission from the first node 102a to the second node 104 may be permitted or even amplified, but if the weighting is decreased or weakened, the transmission from the first node 102a to the second node 104 may be lessened or prevented entirely.

As shown, a plurality of additional first nodes 102b, 102c, etc. may also be connected to the second node 104 by respective portions of connectors 106b, 106c, etc., that are upstream of the second node 104 and respective synapses 108b, 108c may be configured between the respective first nodes 102b, 102c and the second node 104.

In such a configuration, and in accordance with embodiments described herein, the synapses 108a, 108b, 108c can be trained by the neuromorphic network during operation. That is, the synapses 108a, 108b, 108c can be trained to provide weight adjustments dependent on spike events from the respective nodes (first nodes 102a, 102b, 102c, and second node 104). The synapses, as employed herein, may be configured from materials that change transmission by the application of stimuli such as electrical current, heat, etc.

Thus, in accordance with the example embodiment of FIG. 1, the first node 102a and the second node 104 are connected by the portion of the connector 106a that is upstream of the second node 104, with the synapse 108a located along the portion of the connector 106a that is upstream of the second node 104 and between the first node 102a and the second node 104. The first node 102a may transmit a signal along the portion of the connector 106a that is upstream of the second node 104 toward the second node 104. The signal from the first node 102a may be a pre-pulse or presynaptic spike. Similarly, a signal may be transmitted from the second node 104 along a connector 106d that is downstream of the second node 104 (as shown, away from first node 102a), and this may be a post-pulse or postsynaptic spike. In some instances, the postsynaptic spike may occur after the second node 104 receives or detects the signal from the first node 102a.

Physical neural networks or neuromorphic networks may be implemented with adjustable resistance material to emulate the function of a neural synapse, i.e., adjustable resistance material is used to form the synapses 108a, 108b, 108c, which may thus impact the transmissions of signals between nodes. The coupling strength between an input and an output "neuron" (nodes 102a, 104, respectively) may be adjusted through the magnitude of the resistance of the synapse located between the nodes 102a, 104. One technical implementation of a synapse could be employed using a phase-change resistance memory element. Such an implementation may be used to modulate the amplitude of an electrical pulse that is conveyed along the connector 106. In operation, the electrical pulse may be converted to an acoustic signal and then converted back to an electrical pulse while passing through the synapse.

It may be advantageous to have a timing-dependent coupling (rather than amplitude-dependent) between two nodes, i.e., synapses that can impact that timing of signals propagating therethrough. For example, such timing-dependent couplings may be used for sorting numbers and travelling salesman optimization. Such a synapse could be configured to provide an adjustable or tunable time delay to an incoming input pulse before it is transmitted to as an output pulse, i.e., a pulse from a first node (e.g., first node 102a) to a second node (e.g. second node 104) may be time-altered. Using mercury-delay lines or tubes as the synapses is one potential solution. The time delay that is achieved by such a mercury delay line may be determined by or dependent upon the length of the tube divided by the speed of sound in liquid mercury. However, in such configurations, the time-delay that is generated by the mercury tube cannot be tuned or altered directly, but rather the entire device (i.e., the mercury tube) would need to be replaced to provide a different time delay.

In a mercury delay-line, an electrical signal is transformed into an acoustic signal and back into an electrical signal as the signal propagates into and through the mercury tube. The time-delay in the signal is obtained by the sound propagation length and the speed of sound in the transmitting material. In a solid-state device the propagation length cannot be easily tuned or altered.

However, the speed of sound can be tuned if a material undergoes a phase-change. Typically, a material in its amorphous state exhibits a speed of sound that is lower than the speed of sound of the same material in crystalline state of the material. Similar to phase-change memory, where a resistance in a material is modified by partially crystallizing an amorphous chalcogenide, an amorphous phase-change material may be employed as a propagation material that may adjust a time-delay through partial crystallization.

As provided herein, a tunable time-delay element is provided that may be used as a synapse in neuromorphic networks. In accordance with various embodiments, the tunable time-delay element may be formed from a phase-change material, or portions thereof, and be compatible to resistive coupling implementations.

Figure 2:
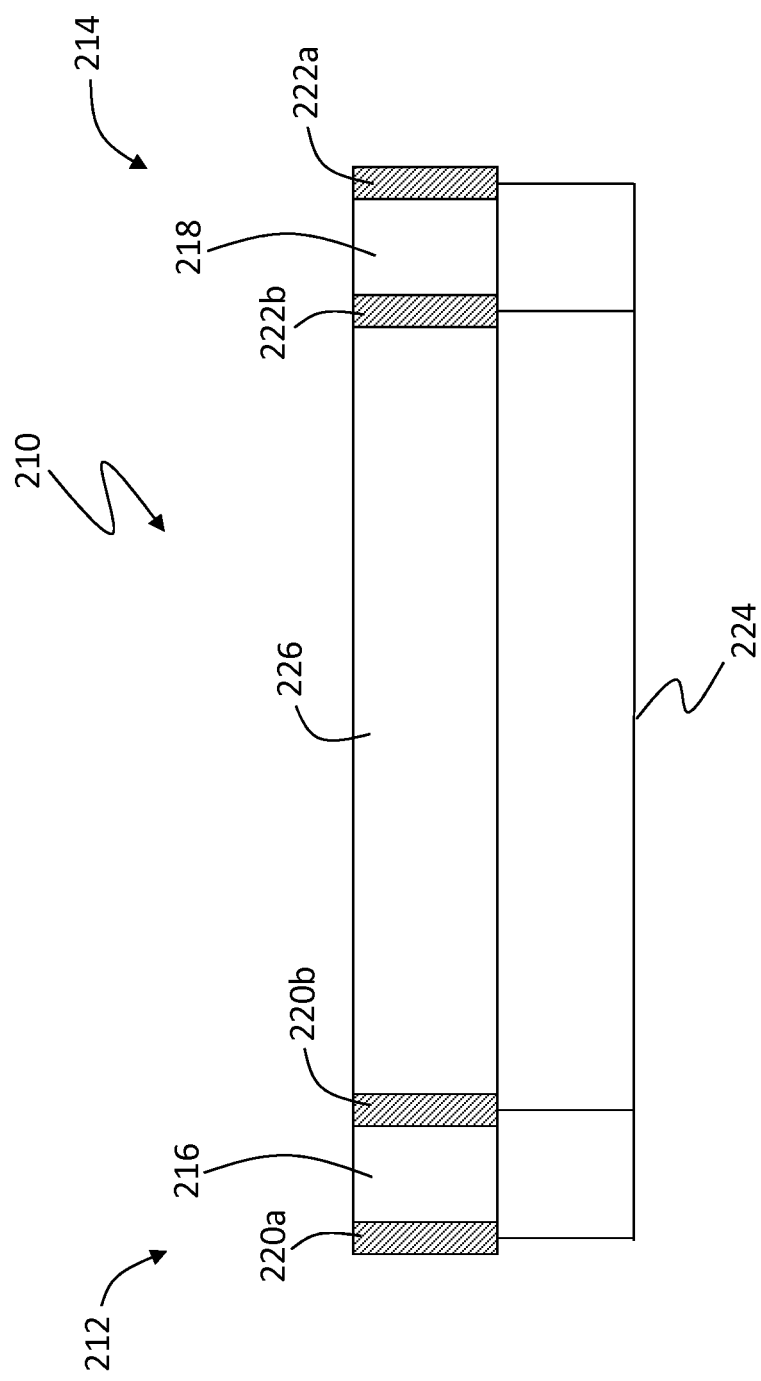
FIG. 2 is a schematic illustration of a time-delay element in accordance with an embodiment of the present disclosure.

Turning now to FIG. 2, a tunable time-delay element 210 in accordance with an embodiment of the present disclosure is shown. The tunable time-delay element 210 may be configured within a neuromorphic network as a synapse located between two or more nodes or neurons of the network. The tunable time-delay element 210 may be configured to have a material characteristic of the tunable time-delay element 210 change such that a time-delay may be imposed on a signal passing through the tunable time-delay element 210. A time-delay imposed by the tunable time-delay element 210 may enable training and learning of a neuromorphic network by enabling increased or decreased pathways between nodes. Because the time-delay element 210 may be tunable, during learning, the time-delay impact on a signal may be adjusted to achieve a desired connection between two or more nodes or neurons.

In the embodiment of FIG. 2, a tunable time-delay element 210 is shown. The tunable time-delay element 210 has a first end 212 and a second end 214. A first actuator 216 may be configured at the first end 212 and a second actuator 218 may be configured at the second end 214. In some non-limiting embodiments, each of the first actuator 216 and the second actuator 218 may be formed of a material that may change a physical property due to application of an electric current. For example, the first actuator 216 and the second actuator 218 may be formed from piezoelectric material (e.g., PZT, quartz, etc.). The actuation of the actuators 216, 218 may generate an acoustic signal. Thus, the actuators 216, 218 may be configured to convert an electrical signal to an acoustic signal. In some embodiments, more than one actuator may be located at each end 212, 214, and/or one or more actuators may be positioned at points located between the first end 212 and the second end 214.

Each actuator 216, 218 may be equipped with electrical contacts that are configured to apply an electrical current to the respective actuator 216, 218. For example, the first actuator 216 may include first electrical contacts 220a, 220b, where the first electrical contacts 220a, 220b are positioned on opposing sides of the first actuator 216. Similarly, the second actuator 218 may include second electrical contacts 222a, 222b, where the second electrical contacts 222a, 222b are positioned on opposing sides of the second actuator 218. The first electrical contacts 220a, 220b and the second electrical contacts 222a, 222b may be electrically connected by an electrical circuit 224. The electrical circuit 224 may be configured to supply a current to one or both of the first electrical contacts 220a, 220b and the second electrical contacts 222a, 222b.

Located between the first actuator 216 at the first end 212 and the second actuator 218 at the second end 214 is a time-delay portion 226. The time-delay portion 226 may be formed from a phase change material (e.g., $Ge_2Sb_2Te_5$, InSb, etc.). The first actuator 216 and the second actuator 218 are configured in operational contact with the time-delay portion 226.

In operation, an input signal (e.g., a voltage or current) may be applied from the electrical circuit 224 to the first electrical contacts 220a, 220b at the first end 212. The input signal may be transmitted into the first actuator 216 at the first end 212. The input signal may induce the first actuator 216 to change physical properties, such as by vibrating or actuating. The actuation of the first actuator 216 by application of the input signal may convert the electrical input signal into an acoustic input signal. That is, in some embodiments, the first actuator 216 may be configured to convert electrical signals into acoustic signals, and thus may be formed from an appropriate material to achieve such transition, as known in the art.

The acoustic signal may propagate through the time-delay portion 226 of the tunable time-delay element 210 from the first end 212 toward the second end 214. That is, the acoustic signal may propagate along or through the time-delay portion 226 toward the second end 214 where the acoustic signal is transformed back into an electrical output signal at the second actuator 218. In some embodiments, the actuator may also be a detector, i.e., a detector and actuator are configured in a single element, and in other embodiments, the actuator and detector may be configured in separate elements. The input signal may be an electrical signal that is transmitted from one node of a neuromorphic network to another node of the neuromorphic network (as the output electrical signal). During learning and/or training of the neuromorphic network it may be advantageous to weight and/or alter the ability of signals to pass through the tunable time-delay element 210. That is, in some configurations of a neuromorphic network, it may be advantageous to increase or decrease the speed at which a signal may pass through the tunable time-delay element 210.

Thus, as configured, the tunable time-delay element 210 may be able to be tuned or altered to affect a signal that passes from the first end 212 to the second end 214 of the tunable time-delay element 210. For example, by driving a current through the time-delay portion 226 via the electrical contacts 220b, 222b having electrical contact with the time-delay portion 226, the time-delay portion 226 or parts or portions thereof can be made to change phase. That is, in addition to having an acoustic signal pass through the time-delay portion 226 as a part of the neuromorphic network, an electrical signal may pass through the time-delay portion 226 to change the phase and properties of the time-delay portion 226.

A change in the phase of the time-delay portion 226, or a portion thereof, may effect a change of the speed of sound through the time-delay portion 226 from the first end 212 to the second end 214. This, in turn, may modify the propagation time of the acoustic signal that is transmitted from the first actuator 216 to the second actuator 218. Thus, a time-delay may be imparted by the time-delay element 210 to an acoustic signal passing through the time-delay element 210 by altering the acoustic propagation properties of the time-delay portion 226.

Figure 3:
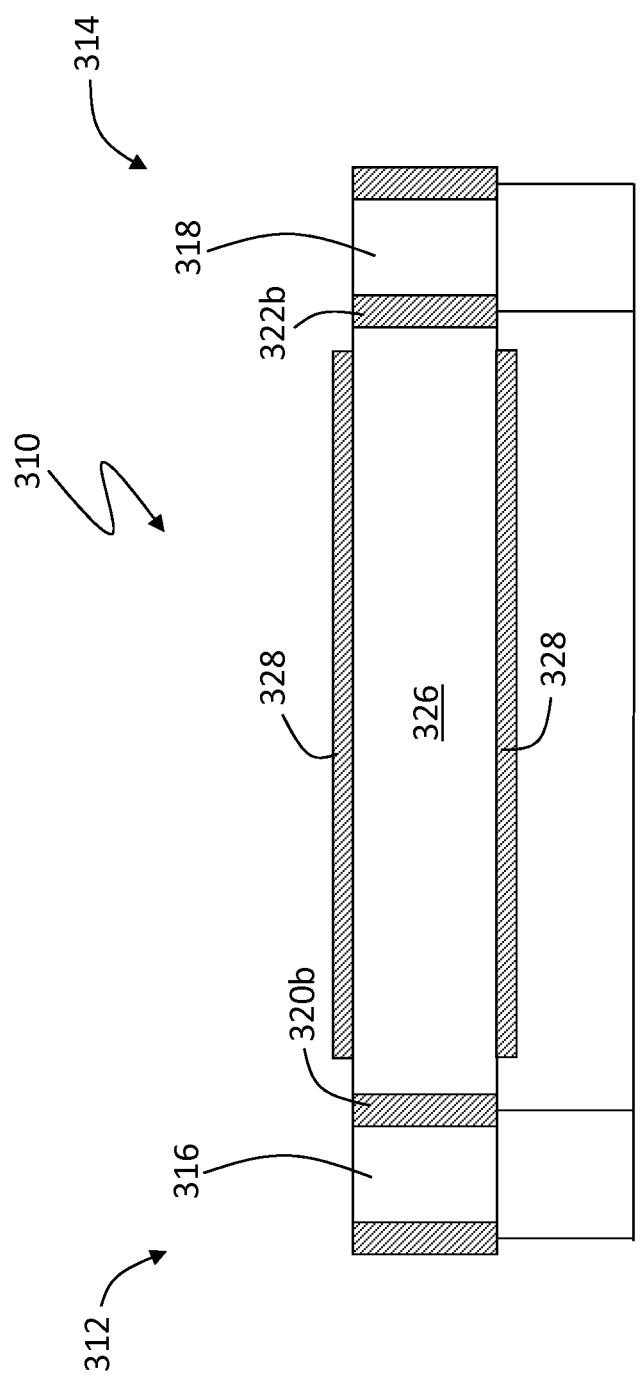
FIG. 3 is a schematic illustration of a time-delay element in accordance with another embodiment of the present disclosure.

Turning to FIG. 3, an alternative configuration in accordance with an embodiment of the present disclosure is shown. FIG. 3 shows a schematic illustration of a time-delay element 310 similar to the time-delay element 210 of FIG. 2, and like features have like reference numbers. As such, description of similar features and structure will not be repeated. In FIG. 3, the electrical contacts 320b, 322b that are in contact with the time-delay portion 326 are configured as heaters. As such, heat may be generated at the electrical contacts 320b, 322b to generate a thermal gradient within the time-delay portion 326. Amplitude, duration, and slope of the heating pulse may crystallize (or re-amorphisize) the material of the time-delay portion 326. The parameters of amplitude, duration, and/or slope of the heating pulse may be used to set crystallization, amorphization, and/or partially crystallized states. In such a configuration, the thermal energy may be used to change the phase and acoustic propagation properties of the time-delay portion 326, and thus impart a time-day to an acoustic signal transmitted from a first actuator 316 at a first end 312 to a second actuator 318 at a second end 314.

Further, as shown, additional and/or separate heaters 328 may be configured or placed along a side or length of the time-delay portion 326. That is, the heaters 328 may be configured to apply a heat gradient directly to the time-delay portion 326, or portions thereof, to effect a phase change in the material of the time-delay portion 326. As will be appreciated by those of skill in the art, the configuration in FIG. 3 may be altered such that the electrical contacts 320b, 322b that contact the time-delay portion 326 may be omitted or the heaters 328 may be omitted. Further, although the heaters 328 as shown are configured as a single length, those of skill in the art will appreciate that the heaters 328 may be configured as a plurality of individual point or area heaters that are configured to effect a desired phase change in the material of the time-delay portion 326 by application of thermal energy.

Figure 4:
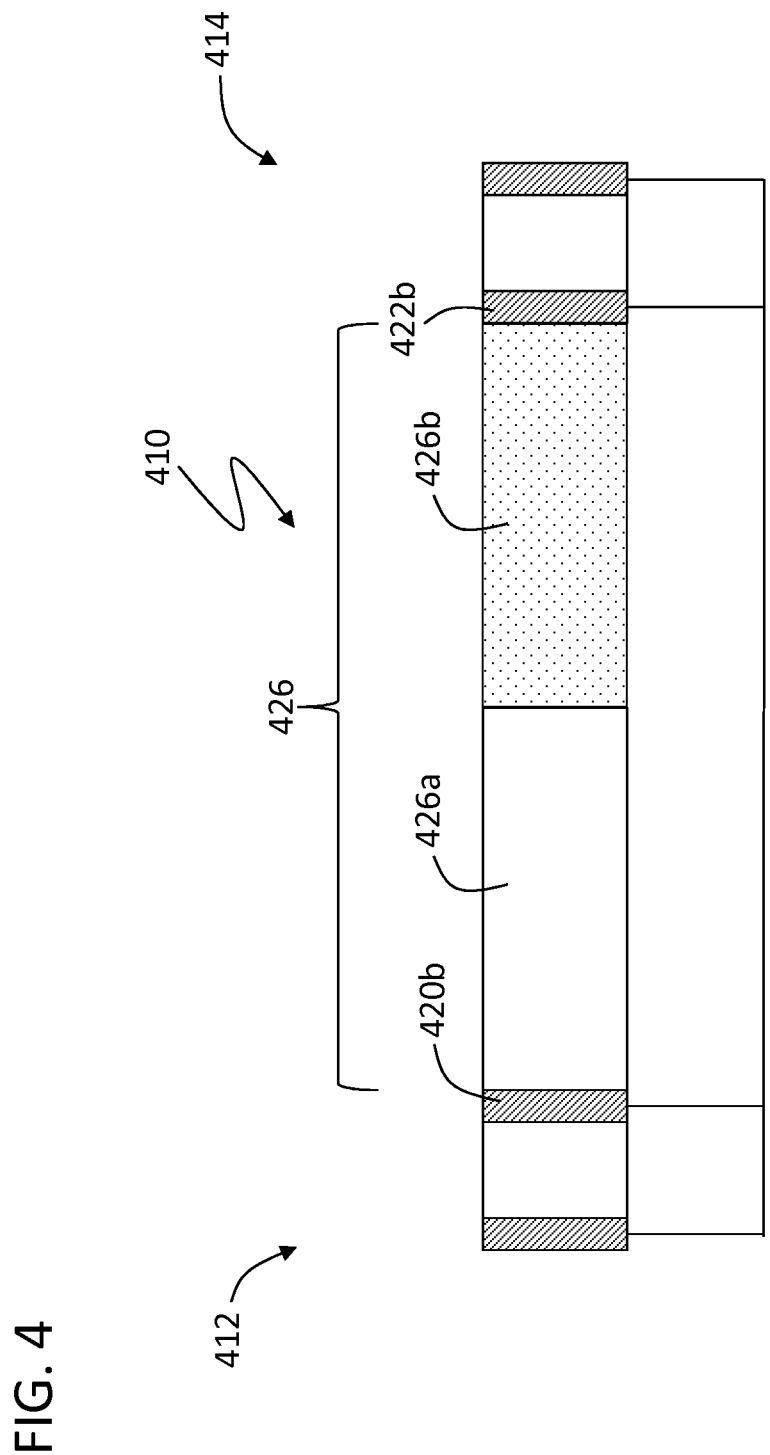
FIG. 4 is a schematic illustration of a time-delay element in accordance with another embodiment of the present disclosure.

Turning to FIG. 4, an alternative configuration in accordance with an embodiment of the present disclosure is shown. FIG. 4 shows a schematic illustration of a time-delay element 410 similar to the time-delay element 210 of FIG. 2, and like features have like reference numbers. As such, description of similar features and structure will not be repeated. In FIG. 4, the time-delay element 426 may be formed with more than one section or portion that may have material properties such that each section or portion can change material properties by application of stimuli. Thus, as shown in FIG. 4, the time-delay element 426 includes a first section 426a and a second section 426b. The first section 426a may be formed of a first phase change material and the second section 426b may be formed of a second phase change material that is different in composition than the first phase change material of the first section 426a. Those of skill in the art will appreciate that other configurations that employ a single material, but different properties are present, may be used without departing from the scope of the present disclosure.

For example, if a first electrical contact 420b at a first end 412 is configured as a heater, the first electrical contact 420b may transmit pulses of heat into the time-delay portion 426. The first section 426a of the time-delay portion 426 may be formed of a high-temperature material such that the material does not change material properties immediately upon receiving the pulses from the first electrical contact 420b. The heat pulses may propagate through the first section 426a and enter the second section 426b. The second section 426b may be formed of a low temperature material. Thus, the second section 426b may change material properties at a lower temperature than the first section 426a. Because the heat must propagate through the first section 426a prior to entering the second section 426b, the amount of thermal energy may be decreased along the path, and thus, the first and second sections 426a, 426b may change phase at the same time or at predetermined times (or thermal energies). Thus, the time-delay element 410 may be tailored to be tuned to any desired configuration. Although described with respect to the application of heat, those of skill in the art will appreciate that the configuration shown in FIG. 4 may be employed using other types of stimuli.

Further, as shown in FIG. 4, the second electrical contact 422b may be positioned in contact with the second section 426b at the second end 414 of the time-delay element 410. The second electrical contact 422b may be configured to provide a heat pulse into the second section 426b to effect a change in the phase of the second section 426b. Thus, further customization or tuning of the time-delay element 410 may be enabled.

As used herein, the phase change material of the time-delay element may be amorphous silicon, germanium, or other material. For example, amorphous silicon has a speed of sound of about 77% compared to the speed of sound of crystalline silicon. Amorphous germanium has a speed of sound of about 82% compared to the speed of sound of crystalline germanium. Amorphous germanium-antimon-telluride, $Ge_2Sb_2Te_5$, has a speed of sound of about 71% compared to the speed of sound of crystalline (cubic) $Ge_2Sb_2Te_5$. By changing the phase of a portion or part of the material of the time-delay portion from crystalline to amorphous, the speed of sound can be lowered typically by about 10% to 40%. Because the propagation time of a sound signal is inversely proportional to the speed of sound this corresponds to a change of propagation time by about 11% to 66%. Although various materials are described herein, those of skill in the art will appreciate that other materials may be used without departing from the scope of the present disclosure. For example, any material, particularly phase change materials that may change resistivity (electrical, acoustic, optical, etc.) due to a change in state or other characteristic may be used.

A benefit of the present disclosure includes a synapse for a neuromorphic network that is tunable by application of stimuli. Further benefits include tunable synapses that include time-delay portions formed from phase change materials that may be impacted by various types of stimuli to impart a tunable time-delay within the synapse of the neuromorphic network.

Note that variations may be made on the above example embodiments; the example embodiments are intended to cover all such modifications, equivalents, and alternatives falling within the scope of the example embodiments. For example, many nodes may be configured with synapses described herein located on communication lines between each pair or any two nodes in the group of nodes.

While the invention is described with reference to example embodiments, it will be understood by those skilled in the art that various changes may be made and equivalence may be substituted for elements thereof without departing from the scope of the description. In addition, many modifications may be made to the teachings herein to adapt to a particular situation without departing from the scope thereof. Therefore, it is intended that the description and claims not be limited the embodiments disclosed for carrying out the above described features, but that the disclosure and description includes all embodiments falling with the scope of the appended claims. Moreover, the use of the terms first, second, etc. does not denote any order of importance, but rather the terms first, second, etc. are used to distinguish one element from another.

What is claimed is:

1. A synapse circuit for a learning neuromorphic network, the synapse comprising:
   a tuneable time-delay portion having a first end and a second end;
   a first actuator located at the first end and in operational contact with the time-delay portion;
   a second actuator located at the second end and in operational contact with the time-delay portion;
   the time-delay portion is formed from a phase change material wherein a change in the material of the time-delay portion alters a propagation time of a signal transmitted from the first actuator to the second actuator;
   a first stimuli transmitted to the time-delay portion at a first time period for altering the time-delay portion to impact the propagation time of a signal transmitted from the first actuator to the second actuator at a first time;
   the second stimuli transmitted to the time-delay portion at a second time period for altering the time-delay portion to impact the propagation time of a signal transmitted from the first actuator to the second actuator at a second time; and
   wherein the propagation time of the first time is different than the propagation time of the second time.

2. The synapse of claim 1, further comprising an electrical circuit configured to apply an input signal at the first actuator and receive an output signal from the second actuator.

3. The synapse of claim 2, wherein the input signal is received from a node of a neuromorphic network.

4. The synapse of claim 1, further comprising a first electrical contact located between the first actuator and the time-delay portion, the first electrical contact configured to apply stimuli to the time-delay portion.

5. The synapse of claim 4, further comprising a second electrical contact located between the time-delay portion and the second actuator, the second electrical contact configured to apply stimuli to the time-delay portion.

6. The synapse of claim 1, further comprising a heater configured to apply thermal energy to the time-delay portion such that a phase of the time-delay portion changes by application of the heat.

7. The synapse of claim 6, wherein the heater is located between the first actuator and the time-delay portion.

8. The synapse of claim 6, wherein the heater is located on a side of the time-delay portion not contacting the first actuator or the second actuator.

9. The synapse of claim 1, wherein the time-delay portion comprises a first section and a second section, wherein the first section is formed of a material that is different from the second section.

10. The synapse of claim 9, wherein the first section is located toward the first end and the second section is located toward the second end of the time-delay portion.

11. A neuromorphic network, comprising:
    a first node configured to transmit a signal;
    a second node configured to receive the signal;
    a connector operationally connecting the first node to the second node; and
    a synapse located on the connector and configured to impact a time of propagation of the signal through the connector from the first node to the second node, the synapse comprising:
      a tunable time-delay portion having a first end and a second end;
      a first actuator located at the first end and in operational contact with the time-delay portion; and
      a second actuator located at the second end and in operational contact with the time-delay portion;
      wherein the time-delay portion is formed from a phase change material wherein a change in the material of the time-delay portion alters the propagation time of the signal as it passes through the time-delay portion;
      a first stimuli transmitted to the time-delay portion at a first time period for altering the time-delay portion to impact the propagation time of a signal transmitted from the first actuator to the second actuator at a first time;
      the second stimuli transmitted to the time-delay portion at a second time period for altering the time-delay portion to impact the propagation time of a signal transmitted from the first actuator to the second actuator at a second time; and
      wherein the propagation time of the first time is different than the propagation time of the second time.

12. The neuromorphic network of claim 11, further comprising an electrical circuit configured to apply an input signal at the first actuator and receive an output signal from the second actuator.

13. The neuromorphic network of claim 12, wherein the input signal is received from a node of a neuromorphic network.

14. The neuromorphic network of claim 11, further comprising a first electrical contact located between the first actuator and the time-delay portion, the first electrical contact configured to apply stimuli to the time-delay portion.

15. The neuromorphic network of claim 14, further comprising a second electrical contact located between the time-delay portion and the second actuator, the second electrical contact configured to apply stimuli to the time-delay portion.

16. The neuromorphic network of claim 11, further comprising a heater configured to apply thermal energy to the time-delay portion such that a phase of the time-delay portion changes by application of the heat.

17. The neuromorphic network of claim 16, wherein the heater is located between the first actuator and the time-delay portion.

18. The neuromorphic network of claim 16, wherein the heater is located on a side of the time-delay portion not contacting the first actuator or the second actuator.

19. The neuromorphic network of claim 11, wherein the time-delay portion comprises a first section and a second section, wherein the first section is formed of a material that is different from the second section.

20. The neuromorphic network of claim 19, wherein the first section is located toward the first end and the second section is located toward the second end of the time-delay portion.

* * * * *